US012620202B2

(12) United States Patent
Lee et al.

(10) Patent No.: US 12,620,202 B2
(45) Date of Patent: May 5, 2026

(54) OUT-OF-DISTRIBUTION DETECTION SYSTEM AND METHOD BASED ON FEATURE MAP OF CONVOLUTIONAL NEURAL NETWORK

(71) Applicant: GWANGJU INSTITUTE OF SCIENCE AND TECHNOLOGY, Gwangju (KR)

(72) Inventors: Kyoobin Lee, Gwangju (KR); Yeonguk Yu, Gwangju (KR); Sungho Shin, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 324 days.

(21) Appl. No.: 18/518,159

(22) Filed: Nov. 22, 2023

(65) Prior Publication Data

US 2024/0242482 A1     Jul. 18, 2024

(30) Foreign Application Priority Data

Jan. 18, 2023     (KR) ........................ 10-2023-0007306

(51) Int. Cl.
*G06V 10/00* (2022.01)
*G06V 10/75* (2022.01)
(Continued)

(52) U.S. Cl.
CPC .......... *G06V 10/7715* (2022.01); *G06V 10/75* (2022.01); *G06V 10/764* (2022.01);
(Continued)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS 10,832,076 B2 * 11/2020 Danielsson .............. G06T 7/44
11,537,899 B2 * 12/2022 Ramachandran ... G06F 18/2433
(Continued)

FOREIGN PATENT DOCUMENTS

EP     3 588 441 A1     1/2020

OTHER PUBLICATIONS

[Supportive Materials for Exception to Loss of Novelty] Yu et al., "Block Selection Method for Using Feature Norm in Out-of-distribution Detection," arXiv:2212.02295v2 [cs.CV], Dec. 10, 2022 (11 pages).

(Continued)

*Primary Examiner* — Amir Alavi
(74) *Attorney, Agent, or Firm* — Hauptman Ham, LLP

(57) ABSTRACT

The present invention relates to a system and method for calculating a feature norm on the basis of a feature map of a convolutional neural network and detecting an out-of-distribution object and image on the basis of the calculated feature norm. An out-of-distribution detection system based on a feature map of a convolutional neural network according to the present invention includes a block selection module that selects a convolutional block for out-of-distribution detection among a plurality of convolutional blocks constituting a learned convolutional neural network, and an out-of-distribution detection module that acquires a feature map of a test image from the convolutional block selected by the block selection module, and calculates a feature norm to determine whether or not the test image is an out-of-distribution image.

20 Claims, 7 Drawing Sheets

(51) Int. Cl.

| | |
|---|---|
| *G06V 10/764* | (2022.01) |
| *G06V 10/77* | (2022.01) |
| *G06V 10/771* | (2022.01) |
| *G06V 10/774* | (2022.01) |
| *G06V 10/82* | (2022.01) |

(52) U.S. Cl.
CPC .......... *G06V 10/771* (2022.01); *G06V 10/774* (2022.01); *G06V 10/82* (2022.01)

(58) Field of Classification Search
CPC ...... G06N 3/088; G06N 3/092; G06N 3/0454; G06N 3/0475; G06N 3/0464; G06V 10/82; G06V 10/761; G06V 10/762; G06V 10/764; G06V 10/765; G06V 10/7715; G06V 10/85; G06V 10/476; G06V 10/774; G06V 10/771; G06V 10/754; G06V 10/75; G06V 10/7796
See application file for complete search history.

(56) References Cited

U.S. PATENT DOCUMENTS

| | | | | |
|---|---|---|---|---|
| 11,603,119 | B2 * | 3/2023 | Stimpson .......... | G06F 18/23213 |
| 11,823,445 | B2 * | 11/2023 | Maji ..................... | G06F 9/5027 |
| 12,172,670 | B2 * | 12/2024 | Jiang ...................... | G06V 20/56 |
| 12,288,621 | B2 * | 4/2025 | Babu ................... | A61B 5/7267 |
| 12,361,704 | B2 * | 7/2025 | Ren ........................ | G06V 10/75 |
| 2021/0350203 | A1 | 11/2021 | Das et al. | |
| 2021/0374613 | A1 | 12/2021 | Wang et al. | |
| 2024/0242482 | A1 * | 7/2024 | Lee ..................... | G06V 10/771 |
| 2024/0412084 | A1 * | 12/2024 | Zhao .................... | G06F 9/5011 |

OTHER PUBLICATIONS

Hendrycks et al., "A Baseline for Detecting Misclassified and Out-Of-Distribution Examples in Neural Networks," International Conference on Learning Representations (ICLR), 2017, 12 pages, Cited in the Specification.

Liang et al., "Enhancing the Reliability of Out-Of-Distribution Image Detection in Neural Networks," International Conference on Learning Representations (ICLR), 2018, 15 pages, Cited in the Specification.

Lee et al., "A Simple Unified Framework for Detecting Out-of-Distribution Samples and Adversarial Attacks," 32nd Conference on Neural Information Processing Systems (NeurIPS 2018), 2018, 11 pages, Cited in the Specification.

Korean Office Action issued on Aug. 21, 2025, in connection with corresponding Korean Patent Application No. 10-2023-0007306, along with an English machine translation, (17 pages).

The Wild Tech Diary, "ViT (Vision Transformer)—Transformers for Image Recognition at Scale", Apr. 12, 2022, along with an English machine translation, cited in NPL No. 1, (28 pages).

* cited by examiner

FIG. 5

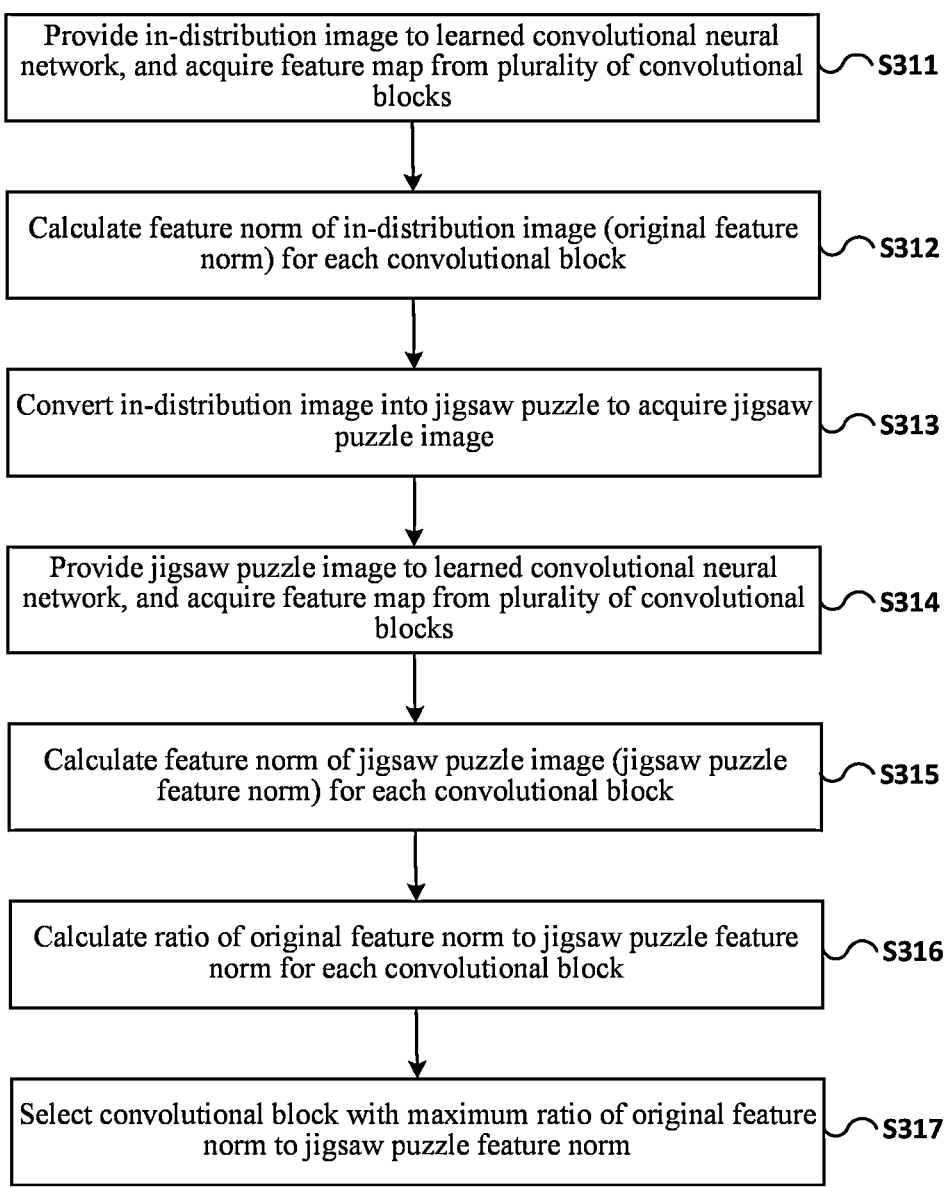

Provide in-distribution image to learned convolutional neural network, and acquire feature map from plurality of convolutional blocks — S311

Calculate feature norm of in-distribution image (original feature norm) for each convolutional block — S312

Convert in-distribution image into jigsaw puzzle to acquire jigsaw puzzle image — S313

Provide jigsaw puzzle image to learned convolutional neural network, and acquire feature map from plurality of convolutional blocks — S314

Calculate feature norm of jigsaw puzzle image (jigsaw puzzle feature norm) for each convolutional block — S315

Calculate ratio of original feature norm to jigsaw puzzle feature norm for each convolutional block — S316

Select convolutional block with maximum ratio of original feature norm to jigsaw puzzle feature norm — S317

Provide test image to learned convolutional neural network and acquire feature map of from selected convolutional block — S321

Calculate feature norm of test image using feature map of selected convolutional block — S322

Compare feature norm of test image with threshold value to determine whether or not test image is an out-of-distribution image — S323

OUT-OF-DISTRIBUTION DETECTION SYSTEM AND METHOD BASED ON FEATURE MAP OF CONVOLUTIONAL NEURAL NETWORK

CROSS-REFERENCE TO RELATED APPLICATIONS

The present application claims priority to Korean Patent Application No. 10-2023-0007306, filed Jan. 18, 2023, the entire contents of which is incorporated herein for all purposes by this reference.

TECHNICAL FIELD

The present invention relates to an out-of-distribution (OOD) detection system and method based on a feature map of a convolutional neural network, and more specifically, to a system and method for calculating a feature norm on the basis of a feature map of a convolutional neural network and detecting an out-of-distribution object and image on the basis of the calculated feature norm.

BACKGROUND

Recently, a deep learning industry is playing a key role when a network provides intelligent services. This deep learning industry is being applied to various fields such as healthcare, robots, autonomous driving, medical diagnosis, and industrial inspection.

In general, a deep learning model is trained in a closed environment and cannot detect an out-of-distribution object or image for which the deep learning model does not have information at the time of training. Therefore, when the out-of-distribution image is input to the deep learning model, class classification is not performed and it should be recognized that there is no information. However, since the deep learning model tends to have overconfidence about an output of the deep learning model, the deep learning model classifies an out-of-distribution image input into a specific class, and such an overconfident neural network reduces the reliability of the deep learning model.

Accordingly, a technology for classifying and detecting an out-of-distribution in a deep learning model is needed.

As an out-of-distribution detection technology of the related art, related art 1 proposed by Hendrycks, et al., "Dan Hendrycks and Kevin Gimpel. A baseline for detecting misclassified and out-of-distribution examples in neural networks. In Proceedings of International Conference on Learning Representations, 2017" proposes a technology for determining to be an out-of-distribution when a maximum value (maximum softmax probability) in a test output distribution of a deep learning model does not reach a certain level. However, such related art 1 has a problem of low detection performance due to an overconfidence prediction problem. Related art 1 may be referred to as an MSP (maximum softmax probability) technology.

Related art 2 proposed by Shiyu Liang, et al., "Shiyu Liang, Yixuan Li, and R Srikant. Enhancing the reliability of out-of-distribution image detection in neural networks. In 6th International Conference on Learning Representations, ICLR 2018, 2018" proposes a technology for smoothing a test output distribution of a deep learning model by applying temperature scaling and input preprocessing, and determining to be an out-of-distribution when a maximum value does not reach a certain level. In related art 2, it is very important to select an appropriate value for a temperature scaling parameter as a hyper parameter, but there is a problem that examples of out-of-distribution samples are needed to set the hyper parameter. Related art 2 may be referred to as an ODIN (Out-of-DIstribution detector for neural networks) technology.

Related art 3 proposed by Ki-Min Lee, et al., "Kimin Lee, Kibok Lee, Honglak Lee, and Jinwoo Shin. A simple unified framework for detecting out-of-distribution samples and adversarial attacks. Advances in neural information processing systems, 31, 2018." proposes a technology for calculating a feature distribution of a deep learning model for each learned category in advance and then, determining to be an out-of-distribution when a Mahalanobis distance between an input and the feature distribution is greater than a specific value. This related art 3 has excellent detection performance for very small-sized (32×32) images, but has a problem in that detection performance for large-sized (224×224) images is very poor. Related art 3 may be referred to as a MAHA technology.

(Prior Document 1) Dan Hendrycks and Kevin Gimpel. A baseline for detecting misclassified and out-of-distribution examples in neural networks. In Proceedings of International Conference on Learning Representations, 2017.

(Prior literature 2) Shiyu Liang, Yixuan Li, and R Srikant. Enhancing the reliability of out-of-distribution image detection in neural networks. In 6th International Conference on Learning Representations, ICLR 2018, 2018.

(Prior Document 3) Kimin Lee, Kibok Lee, Honglak Lee, and Jinwoo Shin. A simple unified framework for detecting an out-of-distribution samples and adversarial attacks. Advances in neural information processing systems, 31, 2018.

SUMMARY

An object of the present invention is to provide an out-of-distribution detection system and method that are applied to a deep learning model and have excellent performance for classifying and detecting an in-distribution image and an out-of-distribution image.

Another object of the present invention is to provide an out-of-distribution detection system and method for calculating a feature norm on the basis of a feature map of a convolutional neural network and detecting an out-of-distribution image and object on the basis of the calculated feature norm.

The present invention can be implemented in various ways, including a device (system), a method, a computer program stored in a computer-readable medium, or a computer-readable medium having the computer program stored therein.

An out-of-distribution detection system based on a feature map of a convolutional neural network according to the present invention includes: a block selection module configured to select a convolutional block for out-of-distribution detection among a plurality of convolutional blocks constituting a learned convolutional neural network; and an out-of-distribution detection module configured to acquire a feature map of a test image from the convolutional block selected by the block selection module, and calculate a feature norm to determine whether or not the test image is an out-of-distribution image.

Preferably, the block selection module includes a jigsaw puzzle generation unit configured to convert an in-distribution image used for training of the learned convolutional neural network into a jigsaw puzzle image to generate a jigsaw puzzle image: a feature map acquisition unit configured to acquire a feature map of the in-distribution image and a feature map of the jigsaw puzzle image from a plurality of convolutional blocks constituting the learned convolutional neural network: a feature norm calculation unit configured to calculate a feature norm from the feature map of the in-distribution image for each of the plurality of convolutional blocks and calculate a feature norm from the feature map of the jigsaw puzzle image; and a block selection unit configured to select a convolutional block for detecting an out-of-distribution from among the plurality of convolutional blocks, on the basis of a ratio of the feature norm of the in-distribution image to the feature norm of the jigsaw puzzle image.

Preferably, the jigsaw puzzle generation unit divides the in-distribution image into a plurality of patch units and then randomly mixes the patch units to generate the jigsaw puzzle image.

Preferably, the feature norm calculation unit calculates norms of individual activation maps included in the feature map of the in-distribution image, and averages the norms of the individual activation maps of the in-distribution image to calculate the feature norm of the in-distribution image for each convolutional block, and calculates norms of individual activation maps included in the feature map of the jigsaw puzzle image, and averages the norms of the individual activation maps of the jigsaw puzzle image to calculate the feature norm of the jigsaw puzzle image for each convolutional block.

Preferably, the norm is a Frobenius norm.

Preferably, the block selection unit selects a convolutional block with a maximum ratio of the feature norm of the in-distribution image to the feature norm of the jigsaw puzzle image as the convolutional block for detecting an out-of-distribution.

Preferably, the block selection unit selects a deep convolutional block as a convolutional block for detecting an out-of-distribution.

Preferably, the out-of-distribution detection module includes a feature map acquisition unit configured to acquire the feature map of the test image from the selected convolutional block when the test image is input to the learned convolutional neural network: a feature norm calculation unit configured to calculate a feature norm from the feature map of the test image; and an out-of-distribution detection unit configured to compare the feature norm of the test image calculated by the feature norm calculation unit with a preset threshold value to determine whether the test image is an out-of-distribution image.

Preferably, the feature norm calculation unit calculates the norms of the individual activation maps included in the feature map of the test image, and averages the norms of the individual activation maps of the test image to calculate the feature norm of the test image.

Preferably, the norm is a Frobenius norm.

Preferably, the threshold value is determined on the basis of a true positive rate when the test image is the in-distribution image.

An out-of-distribution detection method based on a feature map of a convolutional neural network according to the present invention includes: a 10th step of selecting, by a computer system, a convolutional block for out-of-distribution detection among a plurality of convolutional blocks constituting a learned convolutional neural network; and a 20th step of acquiring, by the computer system, a feature map of a test image from the convolutional block selected in the 10th step, and calculating a feature norm to determine whether or not the test image is an out-of-distribution image:

Preferably, the 10th step includes an 11th step of converting an in-distribution image used for training of the learned convolutional neural network into a jigsaw puzzle image to generate a jigsaw puzzle image: a 12th step of acquiring a feature map of the in-distribution image and a feature map of the jigsaw puzzle image from a plurality of convolutional blocks constituting the learned convolutional neural network: a 13th step of calculating a feature norm from the feature map of the in-distribution image for each of the plurality of convolutional blocks and calculating a feature norm from the feature map of the jigsaw puzzle image; and a 14th step of selecting a convolutional block for detecting an out-of-distribution from among the plurality of convolutional blocks, on the basis of a ratio of the feature norm of the in-distribution image to the feature norm of the jigsaw puzzle image.

Preferably, the 11th step includes dividing the in-distribution image into a plurality of patch units and then randomly mixing the patch units to generate the jigsaw puzzle image.

Preferably, the 13th step includes calculating norms of individual activation maps included in the feature map of the in-distribution image, and averaging the norms of the individual activation maps of the in-distribution image to calculate the feature norm of the in-distribution image for each convolutional block; and calculating norms of individual activation maps included in the feature map of the jigsaw puzzle image, and averaging the norms of the individual activation maps of the jigsaw puzzle image to calculate the feature norm of the jigsaw puzzle image for each convolutional block.

Preferably, the norm is a Frobenius norm.

Preferably, the 14th step includes selecting a convolutional block with a maximum ratio of the feature norm of the in-distribution image to the feature norm of the jigsaw puzzle image as the convolutional block for detecting an out-of-distribution.

Preferably, the 14th step includes selecting a deep convolutional block as a convolutional block for detecting an out-of-distribution.

Preferably, the 20th step includes a 21st step of acquiring the feature map of the test image from the selected convolutional block when the test image is input to the learned convolutional neural network: a 22nd step of to calculating a feature norm from the feature map of the test image; and a 23rd step of comparing the feature norm of the test image calculated in the 22nd step with a preset threshold value to determine whether the test image is an out-of-distribution image.

Preferably, the 22nd step includes calculating the norms of the individual activation maps included in the feature map of the test image, and averaging the norms of the individual activation maps of the test image to calculate the feature norm of the test image.

Preferably, the norm is a Frobenius norm.

Preferably, the threshold value is determined on the basis of a true positive rate when the test image is the in-distribution image.

According to the present invention, it is possible to perform classification into and detection of the in-distribution image and the out-of-distribution image through application to a deep learning model.

According to the present invention, it is possible to calculate the feature-norm of the test image on the basis of the feature map of the convolutional neural network and detect whether the test image is the in-distribution image or the out-of-distribution image on the basis of the calculated feature-norm.

According to the present invention, it is possible to detect the out-of-distribution image or object with excellent performance through application to a test step of the deep learning model pre-trained with the in-distribution image.

The effects of the present invention are not limited to the effects mentioned above, and other effects not mentioned will be clearly understood by those skilled in the art in the technical field to which the present invention pertains (referred to as "those skilled in the art") from the description of the claims.

BRIEF DESCRIPTION OF THE DRAWINGS

Embodiments of the present invention will be described with reference to the accompanying drawings described hereinafter, in which like reference numerals represent like elements, but the present invention is not limited thereto.

FIG. 5 is an operational flowchart illustrating a convolutional block selection step of the present invention.

DETAILED DESCRIPTION

Figure 1:
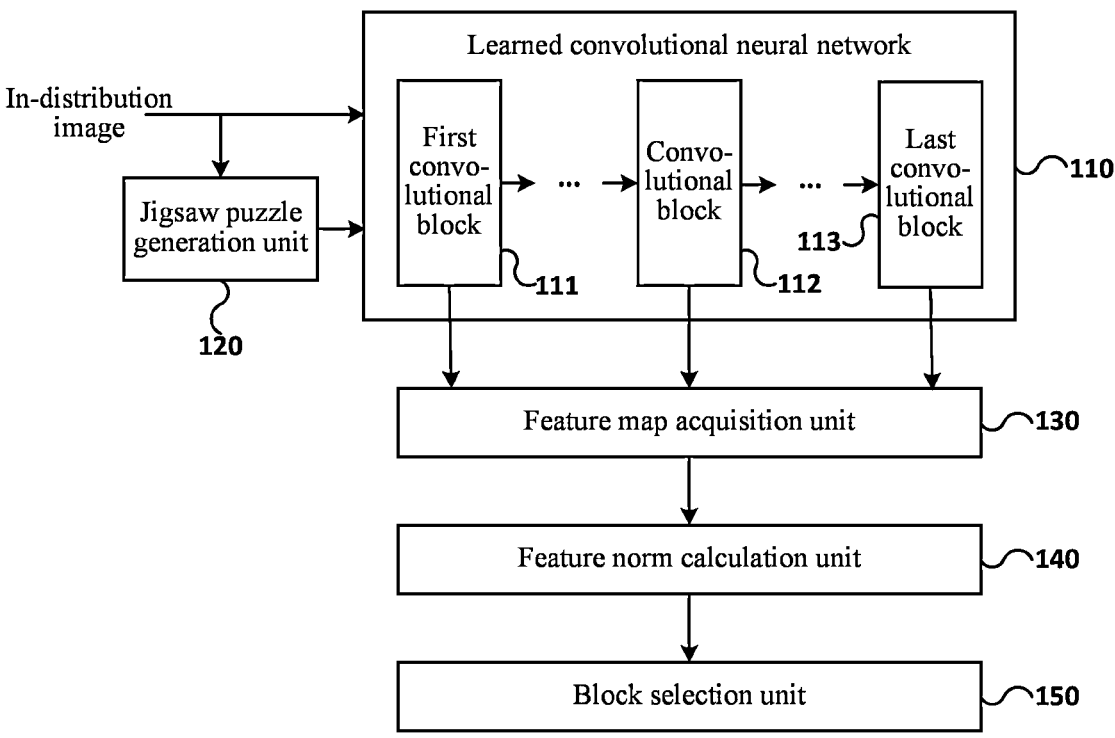
FIG. 1 is a configuration diagram illustrating a block selection module according to the present invention.

Hereinafter, specific details for implementing the present invention will be described in detail with reference to the attached drawings. However, in the following description, detailed description of well-known functions or configurations will be omitted when there is concern that the gist of the present invention is unnecessarily obscured.

In the accompanying drawings, the same or corresponding components are denoted by the same reference numerals. Further, in the description of the following embodiments, repeated description of the same or corresponding components will be omitted. However, even when the description of the components is omitted, it is not intended that such components are not included in any embodiment.

Advantages and characteristics of the embodiments disclosed in the present specification, and methods for achieving these will become clear by referring to the embodiments described below along with the accompanying drawings. However, the present invention is not limited to the embodiments to be disclosed hereinafter and may be implemented in various different forms, and the present embodiments are only provided to fully inform those skilled in the art of the scope of the invention.

Unless otherwise defined, all terms (including technical and scientific terms) used in the present specification may be used with meanings that can be commonly understood by those skilled in the art to which the present invention pertains. Further, terms defined in commonly used dictionaries are not to be interpreted ideally or excessively unless clearly specifically defined.

For example, the term "technology" may refer to a system, method, computer-readable instructions, module, algorithm, hardware logic, and/or operation permitted by the above-described context and throughout the document.

Terms used in the present specification will be briefly described, and the disclosed embodiments will be described in detail. The terms used in the present specification are general terms that are currently widely used as much as possible in consideration of functions in the present invention, but the terms may vary depending on the intention of a technician working in the related field, precedents, or the emergence of new technologies. Further, there are terms arbitrarily selected by the applicant in specific cases, and in this case, the meaning thereof will be described in detail in a relevant description part of the invention. Therefore, the terms used in the present invention should be defined on the basis of meanings of the terms and the overall content of the present invention, rather than simply names of the terms.

In the present specification, singular expressions include plural expressions unless the context clearly specifies singular expressions. Further, plural expressions include singular expressions, unless the context clearly specifies plural expressions. When it is said that a certain portion includes a certain component throughout the specification, this does not mean excluding other components, but may further include the other components unless specifically stated to the contrary.

In the present invention, terms such as 'include and 'including' may indicate the presence of features, steps, operations, elements and/or components, but such terms do not preclude the addition of one or more other functions, steps, operations, elements, components and/or combinations thereof.

In the present invention, when a specific component is referred to as being 'coupled', 'combined', 'connected', 'associated', or 'reacted' to any other component, the specific component may be directly coupled, combined, connected, associated, and/or reacted to the other component, but the present invention is not limited thereto. For example, one or more intermediate components may be present between the specific component and the other component. Further, in the present invention, "and/or" may include each of one or more listed items or a combination of at least some of the one or more items.

In the present invention, terms such as 'first' and 'second' are used to distinguish specific components from other components, and the above-described components are not limited by these terms. For example, a 'first' component may be used to refer to an element in the same or similar form as a 'second' component.

Artificial intelligence (AI) refers to a field of a study of artificial intelligence or methodologies capable of creating the artificial intelligence, and machine learning refers to a field of a study of a methodology for defining and solving various problems dealt with in the field of artificial intelligence. The machine learning is also defined as an algorithm for improving the performance of a certain task through consistent experience.

An artificial neural network (ANN) is a model used in machine learning, and may refer to an overall model with a problem solving capability that is configured of artificial neurons (nodes) forming a network through a combination of synapses. The artificial neural network can be defined by a connection pattern between neurons of another layer, a learning process of updating learning parameters in a model, and an activation function of generating an output value.

The artificial neural network may include an input layer, an output layer, and optionally one or more hidden layers. Each layer may include one or more neurons, and the artificial neural network may include synapses connecting the neurons. In the artificial neural network, each neuron may output a function value of the activation function for input signals input through the synapse, a weight of each layer, and a bias.

The learning parameters of the model refer to parameters that are determined through learning and include a weight of a synaptic connection, a bias of neurons, and the like. Hyper parameters refer to a parameter that should be set before learning in a machine learning algorithm, and include a learning rate, the number of repetitions, a mini-batch size, an initialization function, and the like.

A goal of learning of the artificial neural network can be seen as determining learning parameters for minimizing a loss function. The loss function may be used as an index for determining optimal learning parameters in a learning process of an artificial neural network. Machine learning may be classified into supervised learning, unsupervised learning, and reinforcement learning depending on a learning scheme.

The supervised learning may refer to a method of training an artificial neural network in a state in which a label for learning data is given, and the label may refer to a correct answer (or a result value) that the artificial neural network should infer when the learning data is input to the artificial neural network. The unsupervised learning may refer to a method of training an artificial neural network in a state in which the label for learning data is not given. The reinforcement learning may refer to a learning method of causing an agent defined within a certain environment to learn to select an action or action order for maximizing cumulative reward in each state.

Machine learning implemented with a deep neural network (DNN) including a plurality of hidden layers among artificial neural networks is also called deep learning, and the deep learning is a part of machine learning. Hereinafter, the machine learning is used with a meaning including deep learning. The artificial intelligence can be performed by an artificial neural network module.

In the deep learning, a convolutional neural network (CNN) is a deep learning network specialized in visual image processing, and has brought groundbreaking technological progress to computer vision application programs. The convolutional neural network includes several layers, and continuously processes an input video or image in several layers including a convolutional layer to finally generate an output such as a classification result or an object recognition result.

In the convolutional neural network, a process of generating a feature map through convolutional layers configured of convolutional filters is performed. In this process, a convolution operation through the convolution filters present in each convolution layer occur.

A training data set of the convolutional neural network can be expressed as $$D = \{(x_i, y_i)\}_{i=1}^{N}.$$

Here, $x_i$ is a training input image, $y_i$ is a class label of an object included in the training input image (there may be a plurality of class categories), and the convolutional neural network may be trained to classify a class label corresponding to an input image in a plurality of class categories. Accordingly, when a test input image is input to the learned convolutional neural network, a class label corresponding to the test input image may be output.

The learned convolutional neural network calculates an out-of-distribution detection score for detecting an out-of-distribution for the test input image, and compares the calculated out-of-distribution detection score with a preset threshold value to determine that the test input image is an in-distribution image or the out-of-distribution image. The present invention proposes a new method for calculating the out-of-distribution detection score.

A network logit ($v_i$) and output probability $p_i$ of the convolutional neural network are generally calculated as shown in Equation 1 below.

$$v_i = W_i \cdot f = \|f\| \, \|W_i\| \, \cos(\theta_i) \qquad \text{[Equation 1]}$$

$$p_i = \frac{v_i}{\sum_k \exp v_k}$$

Here, $\|\cdot\|$ denotes an L2-norm, $v_i$ denotes an i-th element of the logit v, f denotes a feature vector, $W_i$ denotes an i-th class weight, and exp denotes an exponential function. Since the output probability $p_i$ is calculated by applying a softmax function to the logit, a harder distribution is obtained as a L2 norm of the feature vector is larger.

The present invention proposes a technology for detecting an out-of-distribution on the basis of a feature map of a learned convolutional neural network in a step of testing the convolutional neural network after training the convolutional neural network with a training data set.

Since the trained convolutional neural network is further activated in the in-distribution image than in the out-of-distribution image because the trained convolutional neural network is trained so that the convolutional filter is activated in an in-distribution sample. Using such a principle, when a norm of the feature map may be calculated in the convolutional filter and the out-of-distribution detection score is calculated, the out-of-distribution image can be detected. However, since calculating the feature map in the entire learned convolutional neural network may worsen an over-confidence problem, a specific block in the convolutional neural network is selected, and the out-of-distribution detection score is generated on the basis of a feature map in the specific block.

The out-of-distribution detection system based on a feature map of a convolutional neural network of the present invention may include a block selection module that selects a convolutional block for out-of-distribution detection among a plurality of convolutional blocks constituting a learned convolutional neural network, and an out-of-distribution detection module that acquires a feature map of a test image from the selected convolutional block, and calculates a feature norm to determine whether or not the test image is an out-of-distribution image.

FIG. 1 is a configuration diagram illustrating a block selection module according to the present invention.

A learned convolutional neural network 110 includes a feature extraction layer and a classification layer. The feature extraction layer may have a large norm of the feature map for the in-distribution image, and may recognize a jigsaw puzzle image obtained by converting the in-distribution image into a jigsaw puzzle as an out-of-distribution image, and have a low norm of the feature map. Therefore, there may be a difference between the norm calculated from the feature map of the in-distribution image and the norm calculated from the feature map of the jigsaw puzzle image created with the in-distribution image, and when the difference is larger, the out-of-distribution can be better detected. The feature extraction layer may include a plurality of convolutional blocks, and each convolutional block calculates each feature map. In the present invention, the norm of the in-distribution image and the norm of the jigsaw puzzle image are calculated for each of the plurality of convolutional blocks constituting the convolutional neural network, and the convolutional block with a large difference between the norms of the two images is selected as a convolutional block for out-of-distribution detection.

The block selection module of the present invention includes a jigsaw puzzle generation unit 120 that converts an in-distribution image used for training of a learned convolutional neural network into a jigsaw puzzle to generate the jigsaw puzzle image, a feature map acquisition unit 130 that receives the feature map of the in-distribution image and a feature map of the jigsaw puzzle image from a plurality of convolutional blocks 111, 112, and 113 constituting the learned convolutional neural network, a feature norm calculation unit 140 that calculates feature norms from the feature map of the in-distribution image and the feature map of the jigsaw puzzle image for plurality of convolutional blocks 111, 112, and 113, and a block selection unit 150 that selects a convolutional block for detecting an out-of-distribution on the basis of a ratio of the feature norm calculated from the feature map of the in-distribution image to the feature norm calculated from the feature map of the jigsaw puzzle image among the plurality of convolutional blocks 111, 112, and 113.

Figure 2A:
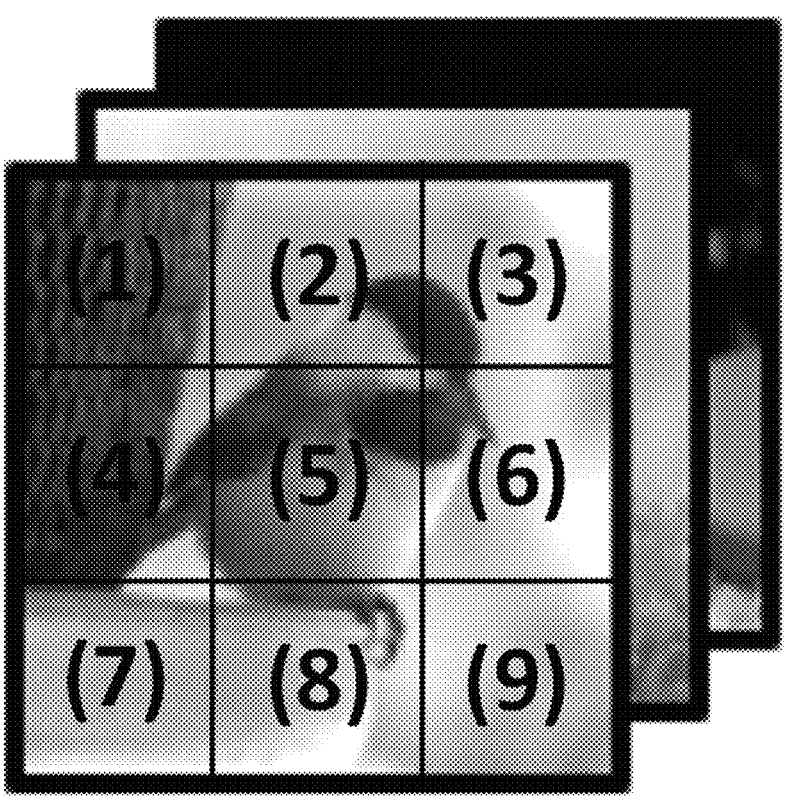
FIG. 2A illustrates an example of an in-distribution image.
Figure 2B:
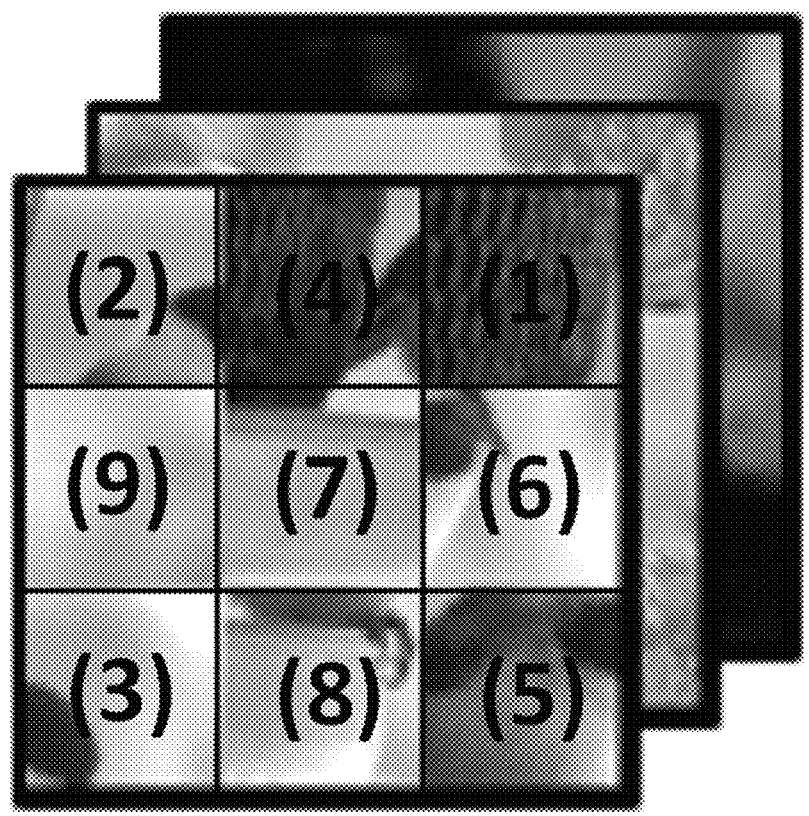
FIG. 2B illustrates an example of a jigsaw puzzle image generated on the basis of the in-distribution image of FIG. 2A.

The jigsaw puzzle generation unit 120 provides the learned convolutional neural network 110 with the jigsaw puzzle image obtained by converting the in-distribution image provided to the learned convolutional neural network 110 into a jigsaw puzzle. The in-distribution image is input to the learned convolutional neural network 110, and each of the plurality of convolutional blocks 111, 112, and 113 calculates and outputs the feature map for the input in-distribution image. In addition, an image obtained by converting the in-distribution image to the jigsaw puzzle (hereinafter referred to as a jigsaw puzzle image) is input to the learned convolutional neural network 110, and each of the plurality of convolutional blocks 111, 112, and 113 calculates and outputs the feature map for the input jigsaw puzzle image. The jigsaw puzzle generation unit 120 may divide the in-distribution image into nine patch units and then randomly mix the nine patches to generate the jigsaw puzzle image. For example, when an in-distribution image with a (32,32) size is divided into patch units with a (11, 11) size, the in-distribution image may be divided into three horizontal and three vertical patch units so that nine patches can be obtained, and the nine patches may be randomly mixed to generate the jigsaw puzzle image. FIG. 2A illustrates an example of the in-distribution image, and FIG. 2B illustrates an example of the jigsaw puzzle image generated on the basis of the in-distribution image of FIG. 2A.

The feature map acquisition unit 130 acquires the feature map of the in-distribution image and the feature map of the jigsaw puzzle image from each of the plurality of convolutional blocks 111, 112, and 113. Each feature map may include a plurality of channels, that is, a plurality of activation maps.

The feature norm calculation unit 140 calculates each feature norm on the basis of the feature map of the in-distribution image and the feature map of the jigsaw puzzle image acquired from the plurality of convolutional blocks.

The feature norm calculation unit 140 may calculate a norm $N_i$ of the individual activation map included in each feature map for each convolutional block and for each image on the basis of Equation 2 below.

$$N_i = \sqrt{\sum_{w}^{W}\sum_{h}^{H}\max(z_i(w, h), 0)^2} \qquad \text{[Equation 2]}$$

Here, $z_i(w,h)$ is w-th and h-th elements of an i channel activation map $z_i$. This equation can be interpreted as a Frobenius norm of an activation map derived with an ReLU activation function. The learned convolutional neural network can be implemented with a ReLU activation function so that the convolutional filters of the convolutional blocks are not activated by the out-of-distribution image. The Frobenius norm is a type of L2 norm, and is a version expanded to a matrix. The norm of the activation map may be calculated as an L1 norm rather than an L2 norm.

The feature norm calculation unit 140 averages the norms of the activation maps of all channels calculated for each convolutional block and each image as shown in Equation 3, to calculate the feature norm for each convolutional block and image.

$$f^{FeatureNorm}(x) = \frac{1}{M}\sum_{m}^{M} N_m \qquad \text{[Equation 3]}$$

The block selection unit 150 calculates a ratio of the feature norm of the in-distribution image (an original feature norm) to the feature norm of the jigsaw puzzle image (a jigsaw puzzle feature norm) for each convolutional block, and selects the convolutional block with a maximum ratio of the original feature norm to the jigsaw puzzle feature norm as the convolutional block for detecting an out-of-distribution.

The learned convolutional neural network extracts a feature hierarchically from the first convolutional block 111 to which an image is input, to the last convolutional block 113. Accordingly, shallow blocks close to the first convolutional block 111 consider low-level abstraction, and deep blocks close to the last convolutional block 113 consider both low-level abstraction and high-level abstraction. That is, low complexity images may be classified into in-distribution images and out-of-distribution images in the shallow blocks, whereas high-complexity images may be classified into in-distribution images and out-of-distribution images in deep blocks.

Accordingly, it is desirable to consider a deep block close to the last convolutional block 113 when the block selection unit 150 selects the convolutional block for detecting an out-of-distribution among the plurality of convolutional blocks.

Figure 3:
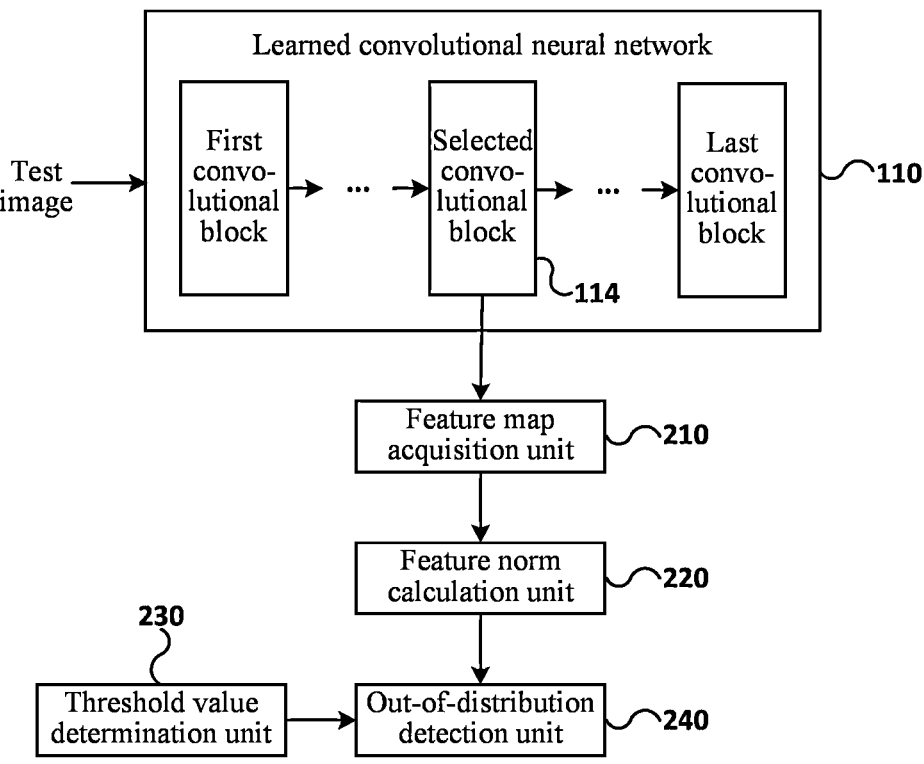
FIG. 3 is a configuration diagram illustrating an out-of-distribution detection module according to the present invention.

FIG. 3 is a configuration diagram illustrating an out-of-distribution detection module according to the present invention.

When the convolutional block for detecting an out-of-distribution is selected by the block selection unit 150 of the block selection module of FIG. 1, the selected convolutional block 114 may be used for a detection as to whether the test image is an in-distribution image or an out-of-distribution image.

The out-of-distribution detection module of the present invention includes a feature map acquisition unit 210 that acquires the feature map of the test image from the selected convolutional block 114 when the test image is input to the learned convolutional neural network, a feature norm calculation unit 220 that calculates a feature norm from the feature map of the test image, a threshold value determination unit 230 that determines a threshold value, and an out-of-distribution detection unit 240 that compares the feature norm of the test image calculated by the feature norm calculation unit with threshold value to determine whether the test image is the in-distribution image or the out-of-distribution image.

The feature map acquisition unit 210 acquires the feature map of the test image including a plurality of activation maps from the selected convolutional block 114.

The feature norm calculation unit 220 calculates the feature norm of the test image on the basis of the plurality of activation maps of the test image. The feature norm calculation unit 220 may calculate the feature norm of the test image like the feature norm calculation unit 140 of FIG. 1. First, the L2 norm ($N_i$) of the individual activation map for each channel of the feature map can be calculated using Equation 2. The present invention is not limited thereto and the feature norm can also be calculated on the basis of the L1 norm.

$$N_i = \sqrt{\sum_w^W \sum_h^H \max(z_i(w, h), 0)^2} \qquad \text{[Equation 2]}$$

Here, $z_i(w,h)$ is w-th and h-th elements of an i channel activation map $z_i$.

Further, the feature norm calculation unit 220 calculates the feature norm of the feature map by averaging the norms of all the activation maps of each test image as shown in Equation 3.

$$f^{FeatureNorm}(x) = \frac{1}{M} \sum_m^M N_m \qquad \text{[Equation 3]}$$

The feature norm calculated from the feature map of the test image may be an out-of-distribution detection score for distinguishing whether the test image is the in-distribution image or the out-of-distribution image.

The threshold value determination unit 230 determines a threshold value that serves as a reference for distinguishing between the in-distribution image and the out-of-distribution image. This threshold value is preferably determined so that a rate of a determination as the in-distribution (this is called a true positive rate (TPR)) when the out-of-distribution is detected with the in-distribution image as a test image is 95% or more. The threshold value determination unit 230 is preferably set in a process of testing the in-distribution image and the out-of-distribution image.

The out-of-distribution detection unit 240 compares the feature norm of the test image with the threshold value to determine the test image to be the in-distribution image when the feature norm of the test image is greater than or equal to the threshold value and determine the test image to be the out-of-distribution image when the feature norm of the test image is smaller than the threshold value.

Figure 4:
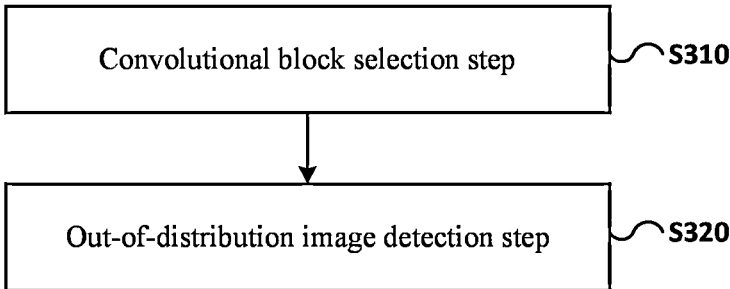
FIG. 4 is an operational flowchart illustrating an out-of-distribution detection method based on a feature map of a convolutional neural network according to an embodiment of the present invention.

FIG. 4 is an operational flowchart illustrating an out-of-distribution detection method based on a feature map of a convolutional neural network according to an embodiment of the present invention. The out-of-distribution detection method based on a feature map of a convolutional neural network of the present invention can be implemented by a processor in a typical computer system.

The out-of-distribution detection method based on a feature map of a convolutional neural network of the present invention includes a convolutional block selection step S310 of selecting, by a computer system, a convolutional block for out-of-distribution detection among a plurality of convolutional blocks constituting a learned convolutional neural network, and an out-of-distribution detection step (S320) of acquiring, by the computer system, the feature map of the test image from the selected block and calculating the feature norm to determine whether the test image is an out-of-distribution image.

FIG. 5 is an operational flowchart illustrating the convolutional block selection step of the present invention.

The computer system provides the in-distribution image to the learned convolutional neural network, and acquires a feature map of the in-distribution image from each of the plurality of convolutional blocks constituting the learned convolutional neural network (S311). Here, the in-distribution image may be an image included in the training data set used when the learned convolutional neural network is learned. Each feature map may include a plurality of activation maps.

The computer system calculates the feature norm of the in-distribution image (original feature norm) for each convolutional block (S312). The computer system may calculate the norms of the individual activation maps of the feature map of the in-distribution image, and average the calculated norms of the individual activation maps to calculate the feature norm of the in-distribution image. The norm may be the Frobenius norm.

The computer system converts the in-distribution image into the jigsaw puzzle to acquire the jigsaw puzzle image (S313). The computer system can divide the in-distribution image into a plurality of small patches, and randomly mix the small patches to generate the jigsaw puzzle image.

The computer system provides the jigsaw puzzle image to the learned convolutional neural network, and acquires the feature map of the jigsaw puzzle image from the plurality of convolutional blocks constituting the learned convolutional neural network (S314). Each feature map may include a plurality of activation maps.

The computer system calculates the feature norm of the jigsaw puzzle image (jigsaw puzzle feature norm) for each convolutional block (S315). The computer system may calculate the norms of the individual activation maps of the feature map of the jigsaw puzzle image, and average the calculated norms of the individual activation maps to calculate the feature norm of the jigsaw puzzle image. The norm may be a Frobenius norm.

The computer system calculates the ratio of the original feature norm to the jigsaw puzzle feature norm for each convolutional block (S316).

The computer system selects the convolutional block with a maximum ratio of the original feature norm to the jigsaw puzzle feature norm (S317). In step S317, the computer system may select a deep block.

Figure 6:
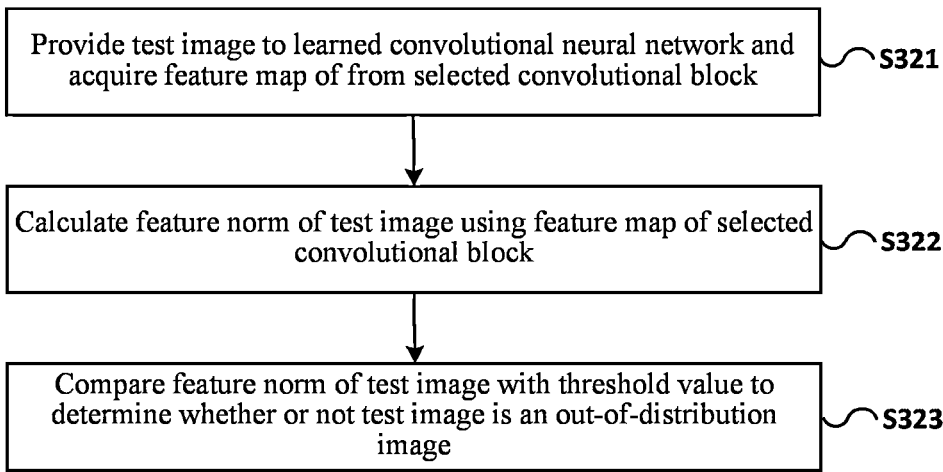
FIG. 6 is an operational flowchart illustrating an out-of-distribution detection step of the present invention.

FIG. 6 is an operational flowchart illustrating the out-of-distribution detection step of the present invention.

One convolutional block is selected from the convolutional neural network learned through a process of FIG. 5.

The computer system provides the test image to the learned convolutional neural network and acquires the feature map of the test image from the selected convolutional block (S321).

The computer system calculates the feature norm of the test image using the feature map acquired from the selected convolutional block (S322). The computer system may calculate the norms of the individual activation maps of the feature map of the test image, and average the calculated norms of the individual activation maps to calculate the feature norm of the test image. The norm may be the Frobenius norm. The feature norm of this test image may be the out-of-distribution detection score for distinguishing whether the test image is the in-distribution image or the out-of-distribution image.

The computer system compares the feature norm of the test image, that is, the out-of-distribution detection score with the threshold value to determine whether or not the test image is an out-of-distribution image (S323). When the feature norm (the out-of-distribution detection score) of the test image is greater than or equal to the threshold value, the computer system determines the test image to be the in-distribution image, and when the feature norm (the out-of-distribution detection score) of the test image is smaller than the threshold value, the computer system determines the test image to be the out-of-distribution image. Here, the threshold value is preferably determined so that a true positive rate (TPR) when the in-distribution image is input as the test image is 95% or more.

All of the above-described methods and processes can be implemented as software code modules executed by one or more general-purpose computers or processors, and be fully automated. The code modules may be stored on any type of computer-readable storage medium or other computer storage device. Some or all of the methods may be implemented with special computer hardware.

Any routine description, elements, or blocks of a flow diagram described in the present specification and/or illustrated in the accompanying drawings should be understood as potentially representing code, modules, segments, or portions containing one or more executable instructions for implementing specific logical functions or elements. Alternative examples are included within a range of the examples described herein, in which elements or functions may be deleted substantially synchronously or in reverse order depending on functions as can be understood herein, or may be executed sequentially from those that have been illustrated or discussed.

Many variations and modifications may be made to the above-described embodiments, and an element thereof should be understood as one of other acceptable examples. All such modifications and variations are intended to be included within the scope of the present disclosure and protected by the following claims. Embodiments according to the present invention described above may be implemented in the form of program instructions that can be executed through various computer components and recorded on a computer-readable recording medium. The computer-readable recording medium may include program instructions, data files, data structures, and the like alone or in combination. The program instructions recorded on the computer-readable recording medium may be particularly designed and constructed for the present invention or may be known and available to those skilled in the art of computer software. Examples of the computer-readable recording medium include magnetic media such as a hard disk, a floppy disk, and a magnetic tape, optical media such as a CD-ROM and a DVD, magneto-optical media such as a floptical disk, and hardware devices particularly configured to store and execute program instructions, such as ROM, RAM, or flash memory. Examples of the program instructions include machine language code such as code produced by a compiler, as well as high-level language code that can be executed by a computer using an interpreter or the like. The hardware devices described above may be configured to operate as one or more software modules to perform the operations of the present invention, and vice versa.

The present invention has been described above with specific details such as specific components, limited embodiments, and drawings, but this is only provided to facilitate a more general understanding of the present invention, the present invention is not limited to the above embodiments, and a person skilled in the art to which the present invention pertains can make various modifications and variations from such description.

Therefore, the spirit of the present invention should not be limited to the above-described embodiments, and the claims to be described below as well as all modifications uniformly or equivalently to the claims fall within the scope of the spirit of the present invention.

DETAILED DESCRIPTION OF MAIN ELEMENTS

110: Learned convolutional neural network
120: Jigsaw puzzle generation unit
130: Feature map acquisition unit
140: Feature norm calculation unit
150: Block selection unit

What is claimed is:

1. An out-of-distribution detection system based on a feature map of a convolutional neural network, comprising:
   a block selection module configured to select a convolutional block for out-of-distribution detection among a plurality of convolutional blocks constituting a learned convolutional neural network; and
   an out-of-distribution detection module configured to acquire a feature map of a test image from the convolutional block selected by the block selection module, and calculate a feature norm to determine whether or not the test image is an out-of-distribution image,
   wherein the block selection module converts an in-distribution image used in training of the learned convolutional neural network into a jigsaw puzzle to generate a jigsaw puzzle image, and selects the convolutional block for out-of-distribution detection using the in-distribution image and the jigsaw puzzle image.

2. The out-of-distribution detection system based on a feature map of a convolutional neural network of claim 1, wherein the block selection module includes
   a jigsaw puzzle generation unit configured to convert an in-distribution image used for training of the learned convolutional neural network into a jigsaw puzzle image to generate a jigsaw puzzle image;
   a feature map acquisition unit configured to acquire a feature map of the in-distribution image and a feature map of the jigsaw puzzle image from a plurality of convolutional blocks constituting the learned convolutional neural network;
   a feature norm calculation unit configured to calculate a feature norm from the feature map of the in-distribution image for each of the plurality of convolutional blocks and calculate a feature norm from the feature map of the jigsaw puzzle image; and a block selection unit configured to select a convolutional block for detecting an out-of-distribution from among the plurality of convolutional blocks, on the basis of a ratio of the feature norm of the in-distribution image to the feature norm of the jigsaw puzzle image.

3. The out-of-distribution detection system based on a feature map of a convolutional neural network of claim 2, wherein the jigsaw puzzle generation unit divides the in-distribution image into a plurality of patch units and then randomly mixes the patch units to generate the jigsaw puzzle image.

4. The out-of-distribution detection system based on a feature map of a convolutional neural network of claim 2, wherein the feature norm calculation unit calculates norms of individual activation maps included in the feature map of the in-distribution image, and averages the norms of the individual activation maps of the in-distribution image to calculate the feature norm of the in-distribution image for each convolutional block, and calculates norms of individual activation maps included in the feature map of the jigsaw puzzle image, and averages the norms of the individual activation maps of the jigsaw puzzle image to calculate the feature norm of the jigsaw puzzle image for each convolutional block.

5. The out-of-distribution detection system based on a feature map of a convolutional neural network of claim 4, wherein the norm is a Frobenius norm.

6. The out-of-distribution detection system based on a feature map of a convolutional neural network of claim 2, wherein the block selection unit selects a convolutional block with a maximum ratio of the feature norm of the in-distribution image to the feature norm of the jigsaw puzzle image as the convolutional block for detecting an out-of-distribution.

7. The out-of-distribution detection system based on a feature map of a convolutional neural network of claim 6, wherein the block selection unit selects a deep convolutional block as a convolutional block for detecting an out-of-distribution.

8. The out-of-distribution detection system based on a feature map of a convolutional neural network of claim 2, wherein the out-of-distribution detection module includes a feature map acquisition unit configured to acquire the feature map of the test image from the selected convolutional block when the test image is input to the learned convolutional neural network;

a feature norm calculation unit configured to calculate a feature norm from the feature map of the test image; and an out-of-distribution detection unit configured to compare the feature norm of the test image calculated by the feature norm calculation unit with a preset threshold value to determine whether the test image is an out-of-distribution image.

9. The out-of-distribution detection system based on a feature map of a convolutional neural network of claim 8, wherein the feature norm calculation unit calculates the norms of the individual activation maps included in the feature map of the test image, and averages the norms of the individual activation maps of the test image to calculate the feature norm of the test image.

10. The out-of-distribution detection system based on a feature map of a convolutional neural network of claim 9, wherein the norm is a Frobenius norm.

11. An out-of-distribution detection method based on a feature map of a convolutional neural network, comprising:

a 10th step of selecting, by a computer system, a convolutional block for out-of-distribution detection among a plurality of convolutional blocks constituting a learned convolutional neural network; and a 20th step of acquiring, by the computer system, a feature map of a test image from the convolutional block selected in the 10th step, and calculating a feature norm to determine whether or not the test image is an out-of-distribution image, wherein the 10th step includes converting an in-distribution image used in training of the learned convolutional neural network into a jigsaw puzzle to generate a jigsaw puzzle image, and selecting the convolutional block for out-of-distribution detection using the in-distribution image and the jigsaw puzzle image.

12. The out-of-distribution detection method based on a feature map of a convolutional neural network of claim 11, wherein the 10th step includes an 11th step of converting an in-distribution image used for training of the learned convolutional neural network into a jigsaw puzzle image to generate a jigsaw puzzle image;

a 12th step of acquiring a feature map of the in-distribution image and a feature map of the jigsaw puzzle image from a plurality of convolutional blocks constituting the learned convolutional neural network;

a 13th step of calculating a feature norm from the feature map of the in-distribution image for each of the plurality of convolutional blocks and calculating a feature norm from the feature map of the jigsaw puzzle image; and a 14th step of selecting a convolutional block for detecting an out-of-distribution from among the plurality of convolutional blocks, on the basis of a ratio of the feature norm of the in-distribution image to the feature norm of the jigsaw puzzle image.

13. The out-of-distribution detection method based on a feature map of a convolutional neural network of claim 12, wherein the 11th step includes dividing the in-distribution image into a plurality of patch units and then randomly mixing the patch units to generate the jigsaw puzzle image.

14. The out-of-distribution detection method based on a feature map of a convolutional neural network of claim 12, wherein the 13th step includes calculating norms of individual activation maps included in the feature map of the in-distribution image, and averaging the norms of the individual activation maps of the in-distribution image to calculate the feature norm of the in-distribution image for each convolutional block; and calculating norms of individual activation maps included in the feature map of the jigsaw puzzle image, and averaging the norms of the individual activation maps of the jigsaw puzzle image to calculate the feature norm of the jigsaw puzzle image for each convolutional block.

15. The out-of-distribution detection method based on a feature map of a convolutional neural network of claim 14, wherein the norm is a Frobenius norm.

16. The out-of-distribution detection method based on a feature map of a convolutional neural network of claim 12, wherein the 14th step includes selecting a convolutional block with a maximum ratio of the feature norm of the in-distribution image to the feature norm of the jigsaw puzzle image as the convolutional block for detecting an out-of-distribution.

17. The out-of-distribution detection method based on a feature map of a convolutional neural network of claim 16, wherein the 14th step includes selecting a deep convolutional block as a convolutional block for detecting an out-of-distribution.

18. The out-of-distribution detection method based on a feature map of a convolutional neural network of claim 11, wherein the 20th step includes a 21st step of acquiring the feature map of the test image from the selected convolutional block when the test image is input to the learned convolutional neural network;

a 22nd step of calculating a feature norm from the feature map of the test image; and a 23rd step of comparing the feature norm of the test image calculated in the 22nd step with a preset threshold value to determine whether the test image is an out-of-distribution image.

19. The out-of-distribution detection method based on a feature map of a convolutional neural network of claim 18, wherein the 22nd step includes calculating the norms of the individual activation maps included in the feature map of the test image, and averaging the norms of the individual activation maps of the test image to calculate the feature norm of the test image.

20. The out-of-distribution detection method based on a feature map of a convolutional neural network of claim 19, wherein the norm is a Frobenius norm.

* * * * *